Figure 1:
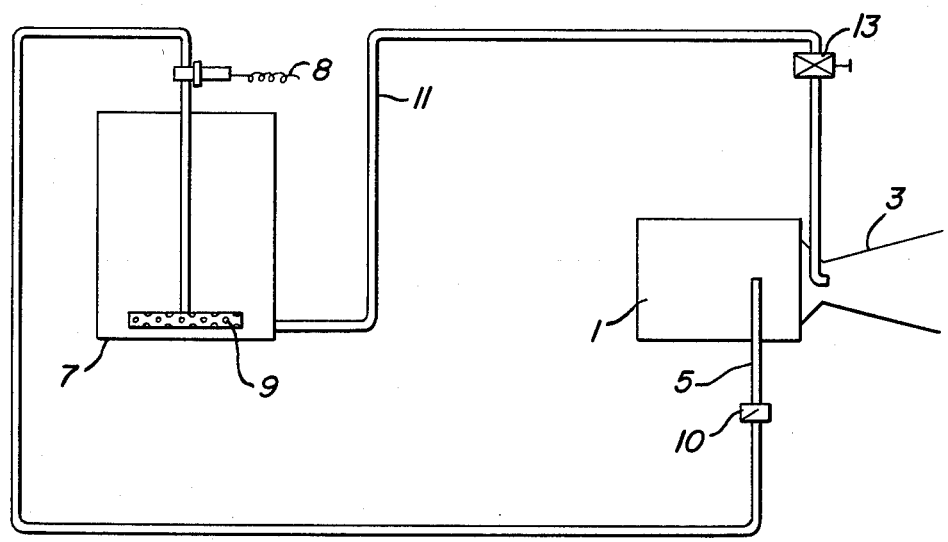

United States Patent [19]

Shaffer

[11] 3,975,292

[45] Aug. 17, 1976

[54] METHOD OF SCREENING INFRA-RED RADIATION

[75] Inventor: Roy E. Shaffer, Bel Air, Md.

[73] Assignee: The United States of America as represented by the Secretary of the Army, Washington, D.C.

[22] Filed: Oct. 1, 1963

[21] Appl. No.: 337,966

[62] Division of Ser. No. 35, 380, June 10, 1960.

[52] U.S. Cl. .............................. 252/305; 252/363.5; 250/342
[51] Int. Cl.² ........................ B01D 3/06; C09K 3/30
[58] Field of Search ................ 250/83, 108; 88/107; 252/478, 305, 363.5, 365; 343/18, 18 R, 18 E

[56] References Cited
UNITED STATES PATENTS

| | | | |
|---|---|---|---|
| 1,456,112 | 5/1953 | Acheson | 252/315 |
| 2,512,435 | 6/1950 | Mitchell et al. | 252/315 |
| 2,871,344 | 1/1959 | Busignies | 343/18 |
| 2,909,491 | 10/1959 | Harman et al. | 252/305 |
| 2,927,849 | 3/1960 | Greblick | 149/87 |
| 2,944,029 | 7/1960 | Jones et al. | 252/305 |
| 3,242,098 | 3/1966 | Andrews | 252/305 |

FOREIGN PATENTS OR APPLICATIONS

| | | | |
|---|---|---|---|
| 1,059,622 | 6/1959 | Germany | 252/305 |

*Primary Examiner*—Benjamin R. Padgett
*Assistant Examiner*—David Leland
*Attorney, Agent, or Firm*—Nathan Edelberg; Kenneth P. Van Wyck

EXEMPLARY CLAIM

1. A method of forming an aerosol of flake-like aluminum particles having diameters in the range of 2 to 20 microns and thicknesses of less than 3/10 micron wich comprises feeding into a hot, high velocity gas stream a suspension of said particles in a hydrocarbon oil, the temperature of said gas stream being sufficient to quickly vaporize said hydrocarbon oil thereby forming a mixed stream of hot gases, hydrocarbon oil vapors and said aluminum particles, and discharging said mixed stream into the atmosphere.

1 Claim, 2 Drawing Figures

METHOD OF SCREENING INFRA-RED RADIATION

The invention described herein may be manufactured and used by or for the Government of the United States of America for governmental purposes, without the payment to me of any royalty.

This application is a division of my prior application Ser. No. 35,380 filed June 10, 1960.

This invention relates to screening infra-red radiation. It is useful, e.g., in frustrating reconnaissance by infra-red photography or blanking out detection apparatus employing infra-red radiation.

The method comprises forming between the source of infrared radiation and the point of reception an aerosol or "smoke screen" composed of small flat flakes of material which is opaque to the infra-red radiation and of high respectivity, the maximum dimensions of the particles being of the same order of magnitude as the wave lengths of the radiation. Aluminum flakes having diameters in the range of 2 to 20 microns and thicknesses of less than 3/10 micron have been found to be effective in my new method. (The minimum thickness must be sufficient to render the particles opaque. This is so far below the thickness of available particles as to be of no particular significance.) Aluminum powder of this character is commercially available, being used as pigment. A suitable concentration is about 1.15 mg. per cubic foot of air. Thus, a cloud 500 feet wide, 1000 feet long and 11 feet deep would contain about 75 Kg. or 165 lbs. aluminum. This may, however, be widely varied, since the effectiveness of screening is a function of the concentration and length of path through the aerosol. The concentration and size of the cloud will therefore be specified on the basis of various factors, among them strength of the radiation from the target or source, the distance between the detector and the target or source, the type of detecting means employed.

There is one important factor which does not affect the required concentration and the cloud size, namely, the wave-length of the radiation. This is one of the great advantages of my method as compared to the use of the usual oil fog "smoke" screens. The latter are very effective against the "near" infra-red radiation of less than about one micron wave-length but fall off very rapidly in effectiveness as the wave length increases, becoming almost completely ineffective at wave lengths of about 5 microns. In contrast, the aluminum flake "smoke" screen gives almost constant per cent attenuation across the wave-length spectrum up to at least 15 microns wave length.

The effectiveness of the agent may be expressed in terms of the "J Value", defined by the formula $$J = \ln \frac{I_o}{I_T/LC},$$

wherein: $I_o$ is the intensity of the radiation received at the receiver in the absence of smoke, $I_T$ is the intensity of the radiation under the same conditions through the smoke, $L$ is the length of the path through the smoke, and $C$ is the concentration of the agent in the cloud. The units used for $I_o$ and $I_T$ are immaterial, so long as they are the same. $C$ is preferably expressed in weight per unit volume, the units of $C$ and $L$ being consistent. For example, $C$ is desirably expressed in grams per cubic meter and $L$ in meters. In that case, $J$ will be expressed in square meters per gram of agent.

A simple physical expression of the meaning of the "J Value" is as follows. Any particle exposed to radiation to which it is opaque will cast a shadow. Then the dimensions of the particle approximate the wave length of the radiation, the area of the shadow, considering a radiator at infinity or otherwise giving parallel rays, is greater than the cross sectional area of the particle. This shadow area is termed the "scattering cross section" of the particle. The "J. Value" is the total scattering cross section of the particles per unit weight, with the particles dispersed and having random orientations.

We have found that the "J. Value" of the aluminum flakes is considerably greater than the average total area of the flakes in any one direction, assuming random orientation and also represents an appreciable increase over the theoretical "J Value" at long wave lengths obtained for spherical metallic particles, where the ratio of mass to scattering cross sectional area increases as the particle size increases. In fact, it is nearly equal to the total area of the flakes in the plane of their faces as measured by standard "covering area" tests.

The aluminum powder may be disseminated either as a dry powder or by introducing a slurry of oil and powder into a hot, high velocity gas stream in which the oil is atomized and vaporized.

A slurry of 30 to 40% by weight of the aluminum powder in 70 to 60% by weight of the standard fog oil, a hydrocarbon oil employed in producing oil fog smoke screens. Government Specification MLF12070A is satisfactory. Because of the light, fluffy nature of the dry powder, such a slurry contains a greater weight of powder per unit volume than does the dry material.

Figure 2:
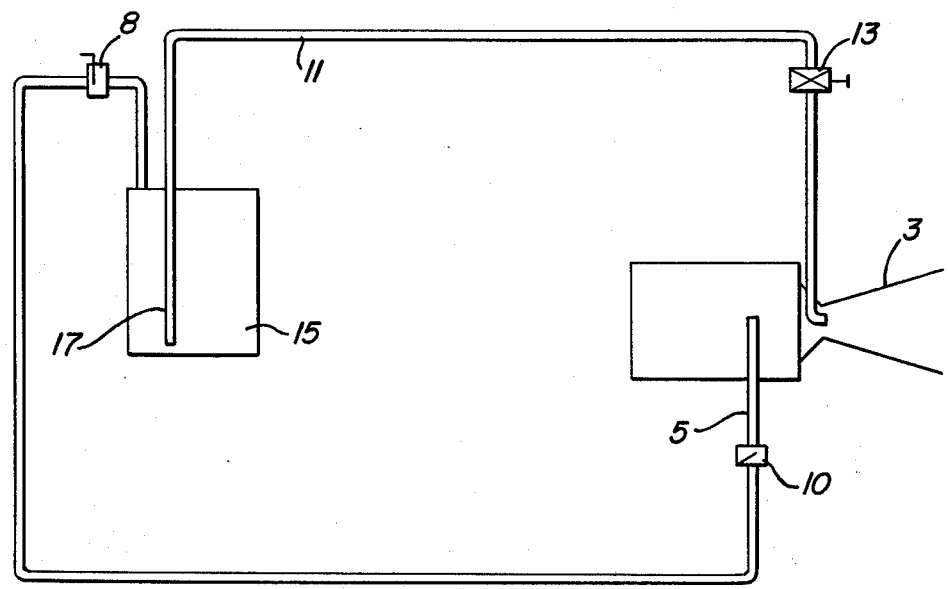

For the dissemination of this aluminum powder, the dry powder or the slurry is preferably introduced into a hot, high velocity gas stream. FIGS. 1 and 2 of the drawing show, diagrammatically, suitable arrangements for the handling of the dry powder and the slurry, respectively. I have found that a gas turbine is a very suitable and convenient source of the gas stream.

For example, I have used successfully the "Mars" turbine, manufactured by the Solar Aircraft Company. This is a single stage turbine including a directly corrected single stage turbine compressor for supplying air to the combustion chamber. Hydrocarbon oils are used as fuels. When used to deliver powder it develops 45 hp at 40,000 r.p.m. When used for aerosol generation the power takeoff is removed and a 3 inch or 4 inch diameter venturi is attached to the exhaust. Temperatures in the range of 500°F to 1000°F and gas velocities up to about 1000 ft./sec. are obtained. The gas velocity and temperature are controlled by adjustment of the fuel supply to the turbine and the choice of the venturi size.

In the drawings, FIGS. 1 and 2 are diagrammatic illustrations of apparatus for carrying out the invention.

Referring to FIG. 1, the gas turbine unit is indicated at 1. A venturi 3 is connected to the exhaust of the turbine. An air line 5 bleeds off compressed air from the compressor stage of the turbine and leads it to an air injector 9 located at the bottom of the closed container 7 in which the dry aluminum powder is stored. The air line 5 contains a solenoid valve 8 and check valve 10. The powder in container 7 is fluidized by the air injector through valve 8 and conveyed through supply line 11 to the throat of venturi 3. Supply line 11 is controlled by a globe valve 13.

The operations of this system is as follows. A high velocity gas stream issuing from the exhaust of turbine 1 through venturi 3 entrains the powder introduced through supply line 11 and disperses it rapidly into the atmosphere. Because of the very fine character of the powder the cloud which is produced is quite stable. It serves as the smoke screen. In this system, employing the dry powder, it is not necessary that the gas stream be hot. However, we have found the gas turbine to be a very compact and efficient of producing the high velocity gas stream required.

The system for dispersing the powder through the use of an oil slurry will be described next. This system is shown in FIG. 2, in which the same numerals indicate the same elements as in FIG. 1. The only difference is that in the slurry system it is unnecessary to fluidize the material since the agent is a fluid. A suspension or slurry of the aluminum powder in fog-oil is stored in a closed container 15. Supply line 11 is provided with a lower portion 17 within the container 15. Air line 5 is connected to the upper part of container 15. The air delivered through air line 5 forces the suspension through the supply line 11 to venturi 3.

The turbine exhaust gases flowing at a very high velocity through venturi 3 atomize the oil-powder suspension and because of the high temperature vaporize the oil. The mixture of aluminum powder, fog-oil vapor and hot gases is discharged into the atmosphere. The fog-oil then condenses to form liquid aerosol particles in the same manner as in the usual fog-oil smoke generation. The aluminum particles are at the same time thoroughly dispersed into the atmosphere in the form of a cloud. Apparently the aluminum particles are ordinarily separated from the fog-oil particles. At any rate, the fog-oil aerosol in no way interferes with the screening action of the aluminum flakes.

The following examples illustrate my invention.

EXAMPLE 1

This test was conducted in a closed chamber. An infrared source and a detector were so mounted as to give a path length between them of 14.5 meters. The chamber was equipped with electrostatic samplers which determined the concentration of screening agent per unit volume. A "Mars" gas turbine engine manufactured by the Solar Aircraft Company with a venturi fitted over its exhaust was arranged to generate an aerosol within the chamber. The agent (dry aluminum powder or fog oil) was introduced into the throat of the venturi.

The materials used were Reynolds 40XD aluminum powder and fog oil. The 40XD powder had a 1% retention on a 325 mesh screen. By microscopic measurements, we found it to have the following size distribution.

| MAXIMUM DIAMETER OF PARTICLES IN MICRONS | AREA, PER CENT OF TOTAL |
| --- | --- |
| 0 – 5 | 24.2 |
| 5 – 10 | 39.2 |
| 10 – 15 | 19.1 |
| 15 – 20 | 17.4 |

The areas given above are those taken in the planes of the faces of the flake-like particles. By means of electron microscope photographs we have found a typical sample to have thicknesses as follows:

| CUMULATIVE PER CENT OF PARTICLES | THICKNESSES IN MICRONS LESS THAN |
| --- | --- |
| 71 | 0.15 |
| 81 | 0.20 |
| 95 | 0.40 |
| 97 | 0.45 |

The total covering area of the flakes as measured by surface coverage tests (See "Edwards" Aluminum Paint and Powder, published 1936 by Reinhold Publishing Corp., pages 36–41) was 3.2 square meters gram and the total average area in any one direction assuming random orientation is shown mathematically to be 0.405 times that area or 1.3 square meters gram.

Sufficient aluminum powder was introduced to give a concentration of 100 micrograms/liter. Comparison tests were conducted using fog oil smoke to insure a controlled standard. From a large number of runs, the following data was obtained.

| WAVELENGTH OF RADIATION IN MICRONS | J VALUE IN M$^2$/GRAM | |
| --- | --- | --- |
| | Aluminum Flakes | Fog Oil "smoke" |
| 0.75 | 2.3 | 2.8 |
| 1.0 | 2.3 | 1.6 |
| 1.5 | 2.3 | 0.8 |
| 3.0 | 2.4 | 0.1 |
| 6.0 | 2.4 | 0.05 |
| 12.0 | 2.5 | 0.03 |

EXAMPLE 2

A field test was conducted to compare the screening effects of aerosols of (a) fog oil, and (b) a mixture of 40% by weight flake aluminum powder and 60% by weight fog oil. The flake aluminum powder was the same product as employed in Example 1.

A target and a detector were mounted about 800 meters apart. The detector consisted of a modified "Penrod" unit which utilizes a thermistor bolometer as the sensitive element. This unit was placed on a 60 ft. tower to insure a good field of coverage. The modifications consisted in taking the signal off the third amplification stage and then rectifying and feeding the signal to an L & N recorder. The target was a cut down oil drum equipped with a stack and a draft. This drum was partially filled with oil which was ignited during the test. The temperatures of the target were 230° for the drum and 420° F. for the stack. Using these temperatures and assuming an emissivity of one, a 60% atmospheric attenuation and an 800 meter range, the target signal at the detector was of the order of $6 \times 10^{-8}$ watts per cm$^2$.

The gas turbine aerosol generator previously described was used, the arrangement shown in FIG. 2 of the drawing being employed. The generator was positioned between the target and detector, about 300 meters from the target and about 75 meters off the direct line between the target and detector on the windward side of that line.

Each run was of one minute duration. During the run employing fog oil alone 18 lbs. of the agent was employed. On successive runs, 11 and 11¼ lbs. of the aluminum-fog oil mixture was used. The wind velocity was between 5 and 7 m.p.h. and the cloud height was estimated at 50 ft. The cloud was not homogenous because of wind variations and terrain features.

The radiation received by the detector was continuously recorded. Because of the uncertainty and variation inherent in the field conditions, quantitative values such as those given in Example 1 could not be obtained. Qualitatively, the aluminum-fog oil mixture gave an attenuation of the radiation many times greater than that given by the fog oil alone. At the optimum points of each run, the attenuation by the mixture approached 100%.

I claim:

1. A method of forming an aerosol of flake-like aluminum particles having diameters in the range of 2 to 20 microns and thicknesses of less than 3/10 micron which comprises feeding into a hot, high velocity gas stream a suspension of said particles in a hydrocarbon oil, the temperature of said gas stream being sufficient to quickly vaporize said hydrocarbon oil thereby forming a mixed stream of hot gases, hydrocarbon oil vapors and said aluminum particles, and discharging said mixed stream into the atmosphere.

* * * * *